Reissued Dec. 12, 1939

Re. 21,291

UNITED STATES PATENT OFFICE 21,291

PRODUCTION OF FATTY ACID ESTERS FROM STARCH FACTORY BYPRODUCTS

Sidney Mark Cantor, Riverside, Ill., assignor, by mesne assignments, to Corn Products Refining Company, New York, N. Y., a corporation of New Jersey No Drawing. Original No. 2,147,241, dated February 14, 1939, Serial No. 159,111, August 14, 1937. Application for reissue June 28, 1939, Serial No. 281,753

6 Claims. (Cl. 260—234)

This invention relates to the production of fatty acid esters from fatty acid containing by-products or waste products of the starch industry, particularly the corn products industry, such as refinery mud or acidulated soap stock, and sugar containing by-products such as starch sugar hydrol.

(1) Refinery mud is the sludge filtered from neutralized converter liquors and contains a relatively large percentage of fatty acids such as palmitic, oleic and linoleic acids.

(2) Acidulated soap stock consists of fatty acids, with impurities, produced by acidification of the caustic wash liquors derived from the refining of corn oil. The material contains a mixture of stearic, palmitic, oleic and linoleic acids.

(3) Starch sugar hydrol ordinarily called hydrol in the starch and starch sugar industries (Henry Berlin, Journal American Chemical Society, vol. 49, pp. 26–27 (1926)), is the mother liquor left after crystallization of dextrose from the acid conversion products of corn starch, removed by centrifuging or pressing and contains a mixture of dextrose and certain di- and tri-saccharides together with complex impurities the di-saccharides being gentiobiose and its isomers.

This invention provides a process where a valuable product useable as a fat or emulsifying agent may be obtained from the above mentioned or similar waste products. In accordance with the invention the fatty acids obtained from sources (1) and/or (2) by vacuum distillation or solvent extraction (with petroleum ether, chloroform, or benzene) or by other suitable means are treated to produce their anhydrides or chlorides; and the hydrol is dehydrated, dissolved with an acid removing catalyst, such as pyridine, or mixed pyridine bases, is reacted by heating with the fatty acid derivatives dissolved in a suitable solvent such as chloroform or carbon tetrachloride. This mixture is then flushed into water and the chloroform solution thus obtained is washed with dilute hydrochloric acid to remove pyridine, then with dilute sodium carbonate to remove acid and finally with water. The chloroform is removed by distillation and the crude esters used as such or further purified by crystallization from 95% ethyl alcohol.

One of the following methods may be used for producing the anhydrides or chlorides of the fatty acids:

(*a*) The crude fatty acids from sources (1) and/or (2) are refluxed with a 10% excess of acetic anhydride for six hours. The excess acetic anhydride and acetic acid are removed by vacuum distillation.

(*b*) The crude fatty acids are dissolved in an equal volume of dioxane or benzene and treated with an excess of thionyl chloride at 30° C. The uncombined thionyl chloride is removed by vacuum distillation. The product will be fatty acid anhydrides or chlorides or mixtures of the same according to the extent to which the reaction is carried.

(*c*) The crude fatty acids from (1) and/or (2) are dissolved in twice their volume of dry toluene and treated with a 10% excess of phosphorous pentachloride, phosphorous trichloride or phosphorous oxychloride. The mixture is treated under a reflux condenser for 3–4 hours, then distilled in vacuo. The material consists of fatty acid chlorides.

A preferred method of treating the hydrol or other sugar containing liquid is as follows:

(*d*) The hydrol is evaporated to dryness in vacuo or by distillation with toluene and is dissolved by slight warming in 7 to 10 times its weight of pyridine.

Further steps of the process are preferably as follows:

(*e*) The fatty acid derivatives from (*a*), (*b*), or (*c*) are dissolved in 7 to 10 times their weight of chloroform and added to the dissolved hydrol at 20° C. and the mixture heated to 100° C. for from 8 to 12 hours to bring about esterification.

(*f*) The material is then flushed into an equal amount of water, the chloroform solution washed with dilute hydrochloric acid to remove the pyridine, with sodium carbonate to remove acid and finally with water. The chloroform is removed by distillation. Purification of the esters may be effected by crystallization from 95% alcohol.

The product, depending upon the extent of its purification, is dark brown to yellow in color and consists of a fatty crystalline mass having emulsifying properties. When purified its melting point is between 70° and 100° C. It has a slight fatty odor and taste and is slightly dextro-rotary in chloroform solution.

The following is a specific example of the application of the invention to practice:

*Example.*—500 grams of refinery mud was boiled with 1 liter of methanol, filtered, and the resulting residue extracted with 100 cubic centimeters of ethyl ether. The mixed solvents were removed and dry potassium carbonate added to the residue until reaction ceased; six normal sulfuric acid was added in excess and the solution refrigerated. 120 grams of fatty acids were obtained in this way.

100 grams of the crude fatty acids dissolved in 100 cubic centimeters of dioxane were placed in a one liter, three necked flask and 46 cubic centimeters of thionyl chloride added, drop by drop, over a two hour period with the temperature at 50°–80° C. Excess of thionyl chloride was removed by distillation on a steam bath. The dioxane was removed by distillation at a vacuum of 50 millimeters of mercury.

30 grams of dried hydrol was partially dissolved in 200 cubic centimeters of dry pyridine and to this, placed in a flask, was added the mixture of fatty acid chlorides and anhydrides which had been dissolved in 200 cubic centimeters of chloroform. The mixture was under a reflux condenser at reflux temperature for 12 hours.

Pyridine was removed by washing twice with 200 cubic centimeter portions of six normal hydrochloric acid; excess of acid was removed by washing twice with two normal sodium carbonate and finally the base was removed by repeated washing with water. The chloroform solution was dried over anhydrous potassium carbonate. The chloroform was removed by distillation and the resulting oil taken up in 400 cubic centimeters of 95% ethyl alcohol. Crystallization resulted in a 40% yield of crude esters.

I claim:

1. Process of producing carbohydrate fatty acid esters from starch factory by-products which comprises: extracting fatty acids from fatty acid containing starch factory residues; converting said fatty acids into one of the group of substances consisting of the anhydrides and chlorides of said fatty acids; and reacting said derivative products in solution with a solution of starch converted sugars in the presence of an acid removing catalyst, and removing the solvents.

2. Process of producing carbohydrate fatty acid esters from starch factory by-products which comprises: extracting fatty acids from fatty acid containing starch factory residues; converting said fatty acids into one of the group of substances consisting of the anhydrides and chlorides of said fatty acids; and reacting said derivative products in solution with a solution of dried starch sugar hydrol in the presence of an acid removing catalyst; and removing the solvents.

3. Process of producing carbohydrate fatty acid esters from starch factory by-products which comprises: extracting fatty acids from fatty acid containing starch factory residues; converting said fatty acids into one of the group of substances consisting of the anhydrides and chlorides of said fatty acids; and reacting said derivative products in solution with a solution of starch converted sugars in the presence of pyridine bases; removing the pyridine hydrochloride, neutralizing the acid and removing the solvent of the fatty acid derivatives by distillation.

4. Process of producing carbohydrate fatty acid esters from starch factory by-products which comprises: extracting fatty acids from fatty acid containing starch factory residues; converting said fatty acids into one of the group of substances consisting of the anhydrides and chlorides of said fatty acids; dissolving said derivative products in a solvent; drying starch sugar hydrol; dissolving the dried hydrol in pyridine bases; mixing the aforesaid solutions and heating the mixture at reflux temperature under a reflux condenser; removing the pyridine with an acid; neutralizing the acid and washing out the salt; and distilling off the solvent of the fatty acid derivatives.

5. Process of producing carbohydrate fatty acid esters from starch factory by-products which comprises: extracting fatty acids from fatty acid containing starch factory residues; converting said fatty acids into one of the group of substances consisting of the anhydrides and chlorides of said fatty acids; dissolving said derivative products in a solvent; drying starch sugar hydrol; dissolving the dried hydrol in pyridine bases; mixing the aforesaid solutions and heating the mixture at reflux temperature under a reflux condenser; removing the pyridine with an acid; neutralizing the acid and washing out the salt; and distilling off the solvent of the fatty acid derivatives and crystallizing the esters from alcohol.

6. Composition of matter comprising the esters of the fatty acids of fatty acid containing starch factory residues, and the sugars contained in starch sugar hydrol.

SIDNEY MARK CANTOR.